Feb. 7, 1961 R. N. NOYCE 2,971,139

SEMICONDUCTOR SWITCHING DEVICE

Filed June 16, 1959

INVENTOR.
ROBERT N. NOYCE
BY
Lippincott & Ralls
ATTORNEYS 2,971,139

SEMICONDUCTOR SWITCHING DEVICE

Robert N. Noyce, Los Altos, Calif., assignor to Fairchild Semiconductor Corporation, Palo Alto, Calif., a corporation of Delaware Filed June 16, 1959, Ser. No. 820,669

6 Claims. (Cl. 317—235)

The present invention relates to an improved transistor structure particularly adapted for use as a two-conductor or three-conductor switching device.

It is known in the art that four element semiconductor devices may be employed as switching units and discussions thereof may be found in the literature as, for example, in the Proceedings of the IRE, September 1956, pp. 1174–1182. By the provision of a transistor structure wherein the total alpha, or current multiplication, varies rapidly from a low value to a high value in the operating range of the device, it is possible to produce highly advantageous switching characteristics. In a four element transistor it is conventional to utilize the same as a two contact switch by reverse-biasing the central junction thereof. With an increasing voltage applied across this type of transistor a reverse voltage breakdown will occur across the central junction thereof, and if this is accompanied by an increase in the alpha of the transistor, there will be produced a second stable region of operation of the device. Such devices normally exhibit in the operating characteristics thereof a high resistance region and a low resistance region. By exceeding the reverse voltage breakdown of the central junction thereof, it is possible to attain continued conduction through the device at a reduced voltage. While the explanations which have been proposed in regard to this phenomenon are by no means incontrovertible, yet the physical manifestations are well documented. It appears that the current through such a device is equal to the current that would flow through the central juncture if it were reversed biased and isolated plus the fraction of the current through the other two junctures which are collected at the central junction. These current fractions are proportional to the avalanche multiplication factor for holes and electrons multiplied by the respective alphas of the separate transistor regions.

With the available theory as briefly noted above, it is possible to design and construct P-N-P-N transistors which are suitable as switching devices. These devices depend upon the increase of alpha with current to determine the voltage difference between "on" and "off" states of the device. This increase of alpha with current may be dependent upon any one of several different phenomena. In this respect reference is made to U.S. Patent 2,855,524, issued October 7, 1958, to W. Shockley for "Semiconductive Switch." In this patent there is set forth one approach to the problem of determining the switching current of a P-N-P-N switching device, and another approach to this problem may be found in the literature in the form of an article published in the 1958 Wescon Convention Record, vol. 2, part 3, pp. 172–4 by J. A. Hoerni and R. N. Noyce. Although the prior art, including the above-noted references, provide various approaches to the design of P-N-P-N switching devices, certain fundamental difficulties are inherent thereto. A practical switching device must have a constant and predetermined operating characteristic and as regards these devices, the switching current is of particular importance.

Extensive investigation and theoretical considerations have shown that substantial difficulty lies in the establishment of desired and invariable switching currents. The foregoing results in part from the fact that the transistor current at which switching occurs is dependent upon poorly controlled parameters of the device, primarily the lifetime of minority carriers. Also, the voltage to which the current rises at the switching joint is determined in part by the surface leakage currents across the junction of the transistor rather than the bulk properties alone of the device. As a consequence of the foregoing it has proven quite difficult to design and fabricate a practical switching device wherein the switching current is precisely predeterminable. Furthermore, it has not been previously possible to design and fabricate switching devices of this type in which the switching voltages are invariable with respect to time and are insensitive to surface contamination. It is well known in the transistor art that surface phenomena are relatively unpredictable and thus any operation which depends in substantial part upon such phenomena is consequently undesirably variable in manners which cannot be accurately predicted. Surface contamination of transistor devices is a problem which has long plagued the art and despite intensive investigation thereof and substantial reduction in the amount of contamination, it is yet true that surface conduction is relatively unpredictable and is variable during the lifetime of the transistor. It will thus be appreciated that switching operations which depend in any substantial part upon surface conduction are inherently unstable and incapable of the precise control required in the electronic field.

The present invention is directed to the provision of a four element transistor adapted for switching operation and having a switching current which is dependent upon readily controlled design parameters of the device so as to be substantially insensitive to changes in the surface conditions thereof. In this manner, then, the present invention provides for the precise and invariable switching operation desired of transistors. It is herein contemplated that the fraction of current passing in the reverse direction through the central junction of the device during the "off" state thereof which is collected at the outer junction of the device will be reduced to a minimum. In the instance wherein no third element control of the device is required, the present invention provides for limited current conduction in the reverse direction therethrough during the "off" state of the switching device in the same manner as a simple reverse-biased diode. Forward biasing of the outer junctions of the device is accomplished solely by the device current passing through the bulk or sheet resistance of the transistor regions. It is thus possible in accordance herewith to provide a geometry of the central transistor regions and a resistivity thereof so that a sufficiently large switching current may be required that surface leakage currents become insignificant by comparison. The foregoing is herein accomplished by the provision of a novel transistor structure. The present invention provides for the electrical shorting of certain transistor junctions so as to attain the above-noted conditions. Additionally, and in conformity with the present invention, the shorting contact may be oriented so that surface leakage currents flow through a much smaller resistance thereto so as to minimize the voltage drop thereof and further limit the effect of such leakage currents.

It is an object of the present invention to provide an improved four element transistor switching device having precisely controlled switching characteristics.

It is another object of the present invention to provide an improved P-N-P-N semiconducting switching device having an invariable switching current.

It is a further object of the present invention to provide an improved P-N-P-N semiconducting switching device having a precisely predeterminable and constant switching voltage.

It is yet another object of the present invention to provide an improved four region transistor switching device wherein the switching point thereof is determined by readily controlled design parameters of the device.

It is a still further object of the present invention to provide an improved P-N-P-N switching device with at least one shorted junction for establishing a predeterminable and constant switching voltage point by the current through the bulk resistance of the transistor region.

Another object of the present invention is to provide an improved P-N-P-N switching device of constant and precisely predeterminable characteristics and having electrical control means for varying the switching point thereof.

Various other possible objects and advantages of the present invention will become apparent to those skilled in the art from the following description; however, no limitation is intended by the precise terms of such description and instead reference is made to the appended claims for a proper delineation of the true scope of this invention.

The present invention is illustrated in the accompanying drawings, wherein.

The present invention in brief comprises a transistor structure including four semiconductor regions or zones of alternate polarity and high current gain. Such a transistor is commonly identified as a P-N-P-N transistor. It is herein contemplated that the structure shall preferably be formed by diffusion techniques, well-known in the art, wherein selected impurities or dopants are controllably diffused into a semiconducting wafer to form transistor junctions therein. In accordance with preferred transistor manufacturing techniques, the terminal transistor zones are made quite minute so as to attain desirable high frequency characteristics. Such terminal transistor zones are preferably diffused into more extensive zones so as to provide a common external transistor surface including portions of both zones. In accordance with this invention there are provided ohmic contacts to the terminal surfaces of the transistor structure covering more than one transistor zone. In this manner there is provided an electrical shorting of at least one transistor junction at one side or surface of the transistor structure. By the connection of suitable electrical circuitry across the P-N-P-N transistor hereof it is possible to produce a highly desirable switching action herewith. In the instance of a two-contact switch, the electrical contacts at the opposite sides of the transistor structure electrically short the transistor junction beween the two transistor zones at such end of the transistor. In this circumstance the transistor operates in much the manner of a conventional reverse-biased diode semiconductor during the "off" state of operation thereof. Forward biasing of the shorted transistor junctions occurs by virtue of the voltage drop established in the transistor zones adjacent the unshorted junction thereof so that complete conduction through the P-N-P-N transistor as such is substantially entirely dependent upon current through the bulk resistance of the transistor zones. In this manner it is possible to reduce the influence of surface leakage current to a minimum so that the switching point of the transistor so constructed is precisely predeterminable from well-known and easily controlled design parameters of the transistor structure.

Figure 1:
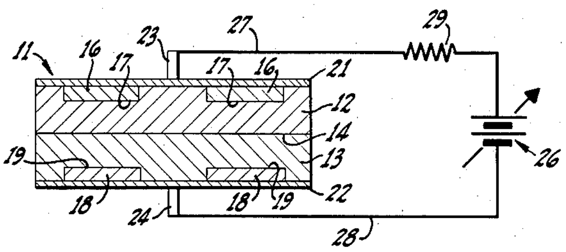
Fig. 1 is a schematic illustration in sectional view of an improved transistor switch in accordance with the present invention and including indicated electrical connections thereto.

Considering now a specific embodiment of the present invention as illustrated in Fig. 1 of the drawings, it will be seen by reference thereto that an improved P-N-P-N transistor in accordance with the present invention is provided as a two-contact switch 11. The transistor 11 illustrated may be formed by conventional diffusion techniques wherein selected impurities are diffused at controlled elevated temperatures into a monocrystalline silicon body. Inasmuch as the techniques of diffusing impurities into semiconducting material such as silicon forms no part of the present invention, no detailed discussion thereof is included herewith. It is, however, contemplated that there shall be formed, as a part of the P-N-P-N transistor, first and second zones of opposite polarity or conductivity type and identified in the drawing by the numerals 12 and 13. These semiconducting zones of opposite polarity are separated by a transistor junction 14 having the normal transistor junction characteristics known in the art. Atop the upper zone or region 12 there are formed one or more minute transistor regions 16, as by the controlled diffusion of selected impurities therein. These zones 16 form, with the adjacent transistor zone 12, intermediate transistor junctions 17 of a conventional nature, and the transistor zones 16 and 12 have a common upper surface. Preferably the upper transistor zones 16 are so positioned in the layer 12 that the latter entirely surrounds the former on this common upper surface and in actuality these upper transistor zones 16 resemble a dot of very small radius. The under portion of the transistor may be formed in the same manner as the upper portion described above wherein one or more minute transistor regions or zones 18 are formed in the under surface of the transistor zone 13 by the diffusion of a selected impurity therein. These transistor zones 18 are preferably formed with very minute dimensions and are sufficiently diffused into the layer 13 so as to form a common under surface of a transistor therewith. Also, the transistor zones 18 include such a selected impurity as to have an opposite polarity from the material of the zone 13 and to thereby define a transistor juncture or junctions 19 between these zones. The structure defined above will be seen to be symmetrical in that the first two mentioned zones 12 and 13 are alike in physical configuration and, furthermore, each has physically similar diffused zones in the outer surfaces thereof and of differing polarity therefrom. It is herein contemplated that the transistor zone or region 12 may be formed of a semiconducting silicon having an impurity therein so as to form an N-type semiconducting zone. The minute transistor zones 16 are then formed of a P-type semiconductor and the zone 13 is also formed of a P-type semiconducting material, with the zones 18 diffused therein comprising an N-type semiconducting reion. The described transistor will thus be seen to be oriented so as to be properly termed a P-N-P-N transistor of relatively symmetrical physical configuration.

In the conventional utilization of P-N-P-N transistors for switching devices it is common to provide electrical contacts only to the outer or terminal zones of the transistor and to leave the inner contacting zones thereof electrically floating. Various theories have been propounded and developed to explain the operation of four element transistors so connected; however, the present configuration is particularly adapted to a different electrical connection so that these previously known theories are only in part applicable thereto. As a further part of the structure of the transistor hereof there is provided an upper ohmic contact 21 formed of a conducting metal which is plated or otherwise deposited upon the common upper surface of the transistor including portions of the N-zone 12 and the the P-zones 16 diffused therein. This ohmic contact 21 will thus be seen to electrically contact in non-rectifying relationship both of the transistor zones 12 and 16 and, in fact, to electrically short the transistor junctions 17 between these zones. Although the electrical shorting of transistor zones is normally considered to be highly undesirable in the manufacture of devices of this sort, particular advantage is herein realized by this structure, as discussed in detail below. Upon the under surface of the transistor structure 11 there is formed a second ohmic contact 22, likewise formed of an electrically conducting metal joined to the under surface of the transistor in non-rectifying relationship. This contact, or metal layer 22, is deposited, as by evaporation or other suitable processes, in electrically conductig relationship to the entire under surface of the transistor so as to thereby electrically contact both the transistor zone 13 and the transistor zones 18 diffused therein. This lower ohmic contact then electrically shorts the transistor junctions 19 between the transistor zones 13 and 18. Electrical leads 23 and 24 are connected in conventional manner to the ohmic contacts 21 and 22 respectively in extension therefrom for connection of the transistor to an external circuit.

Inasmuch as a full and complete explanation of the operation of the present invention can only be provided in connection with a suitable manner of utilization thereof, there is illustrated in Fig. 1 a simple electrical circuit which may be connected to the transistor. This electrical circuit may include a power supply, illustrated as a simple battery 26 connected by leads 27 and 28 across the transistor. These leads 27 and 28 may be connected to or may form an extension of the transistor conductors 23 and 24, as illustrated. Operation of the transistor switch is accomplished by the application of a voltage thereacross and in order to produce a switching action in the invention hereof the applied voltage must be varied. There may then be provided in the external circuit of the transistor switch an additional variable voltage source or, alternatively, in the more simplified aspects thereof the battery 26 may be considered to be variable insofar as the output thereof is concerned. The battery 26 is illustrated by the arrow therethrough as being of a variable nature to provide a variable output voltage. At particular and predeterminable voltage levels the transistor above described provides a very high resistance to the flow of current therethrough and such high resistance characteristic is maintained over a substantial voltage range. By increasing the applied voltage across the transistor switch to a sufficient value, a switching action is caused to occur within the transistor whereby the impedance thereof reduces it to a relatively low value. This low impedance value of the switch in the "on" condition of operation thereof is retained despite the subsequent reduction of applied voltage well below the switching voltage thereof. The switching action of the transistor of this invention may be employed in a variety of circuits to produce rapid and precisely controlled switching of currents therein and in this respect there is illustrated a load resistor 29 connected in series with the battery 26 across the transistor switching device 11.

Considering now the operation of the transistor of this invention in greater detail, it is noted from the above-described physical structure of the transistor that the transistor regions or zones 12 and 16 are electrically connected together by the ohmic contact 21 shorting the transistor junctions 17 between these zones. Likewise, the transistor regions or zones 13 and 18 are electrically connected at the opposite end of the transistor by the ohmic contact 22 which also electrically shorts the transistor junctions 19 between the zones. It will thus be appreciated that in the simple aspects of the device, electrical connection is made from the power supply 26 through the ohmic contacts 21 and 22 which are in effect separated only by the intermediate transistor zones 12 and 13. Thus, at relatively low applied voltages the transistor will be seen to serve as a diode semiconducting device and voltage is applied thereto with such a polarity as to reverse bias the transistor junction 14 between these diode zones. In the instance wherein the transistor zones as considered from the top to the bottom thereof are formed as P-N-P-N semiconducting materials, the zone 12 will thus be an N-type material and the zone 13 a P-type material so that reverse biasing of the transistor junction 14 therebetween is accomplished by maintaining the ohmic contact 21 at a positive potential with respect to the ohmic contact 22. In accordance with conventional and known semiconductor theory, a reverse biased semiconducting diode presents a relatively high impedance to the flow of current therethrough over a substantial range of voltage. This then constitutes the "off" state of operation of the switching device hereof which extends over a substantial voltage range. At a predeterminable high voltage applied across the transistor 11, the central transistor junction 14 will break down and reverse current conduction will occur thereacross. This reverse current flow through the transistor passes from one of the ohmic contacts directly through the intermediate transistor zones 12 and 13 to the other ohmic contact without passage through the end zones 16 and 18. Such current flow will be seen to provide a ready outlet for minority carriers in these intermediate transistor zones. Furthermore, such current flow passes beneath the end transistor zones 16 and 18 to thereby produce a voltage drop by the current flowing through the internal or bulk resistance of semiconducting material of these zones 12 and 13. This voltage produces a bias across the transistor junctions 17 and 19 so as to establish a forward bias voltage thereacross. As a consequence thereof, conduction occurs across these end transistor junctions 17 and 19 so that transistor conduction then results through each of the transistor zones. Inasmuch as the forward biasing of the end transistor zones 17 and 19 results from current flow through the sheet or bulk resistance of the transistor zones 12 and 13 it will be seen that the design of appropriate resistances in these zones 12 and 13 will then establish the point at which forward biasing of the end junctions 17 and 19 occurs. The resistivity of the transistor zones 12 and 13 is readily controlled and is precisely determinable in accordance with known practices. Consequently, the point at which high current conduction through each of the zones of the transistor hereof occurs is likewise readily controlled and precisely determinable. The alpha or current gain of the overall transistor is originally designed to be relatively high, particularly as contrasted to the current gain of the reversed biased diode formed of the transistor zones 12 and 13. Thus it will be seen that following conduction across the transistor junctions 17 and 19 at the point of forward biasing of these junctions, there will be produced a relatively low impedance path for current flow through the transistor. The applied voltage may then be materially reduced without substantially reducing the current flow. To the contrary, a very substantial reduction in the value of applied voltage will produce no reduction in the current through the transistor. In this low impedance or "on" state of the transistor the current through the circuit including same is limited primarily by the value of the load in the circuit, herein illustrated as the resistor 29.

Figure 3:
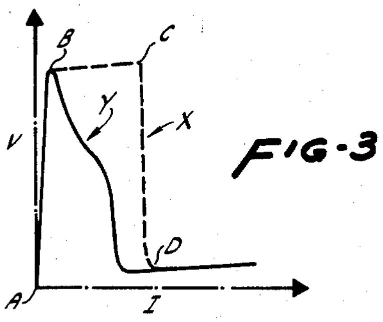
Fig. 3 is a plot of the voltage-current characteristics of the embodiments of the present invention illustrated in Figs. 1 and 2 of the drawings.

Further clarification of the operation is possible by reference to Fig. 3 of the drawing wherein there is illustrated by the curve X thereof a typical voltage-current relationship for a transistor constructed in accordance with the above description. The portion of the illustrated curve between points A and B thereof comprise the "off" state of the transistor wherein a substantial increase in voltage produces but a very slight variation in current conduction therethrough. Reverse voltage breakdown of the transistor junction 14 occurs substantially at point B of the characteristic curve illustrated in Fig. 3 and the portion of the curve between points B and C is indicative of the current increase with slightly increased voltage such as occurs prior to forward biasing of the transistor junctions 17 and 19. The section of the curve X between the points B and C thus represents reverse bias conduction through the transistor zones 12 and 13 following breakdown of the junction 14 therebetween. At the point C on the curve X sufficient current is flowing through the transistor in the region or zone 12 thereof, for example, to establish with the resistance of this zone a voltage drop sufficient to forward bias the transistor junctions 17 between the zones 12 and 16. Similarly, the transistor junction 19 is forward biased at this point by the same current flowing through the transistor zone 13 so that conduction then occurs between the transistor zones 13 and 18 in a forward direction through the transistor junction 19. Inasmuch as the current gain or alpha of the four zone or region transistor is designed to be quite high, forward conduction through the transistor junctions 17 and 19 and across the reverse bias junction 14 which has broken down at this point to permit material current flow in a reverse direction therethrough causes a very substantial reduction in the overall impedance of the transistor. This is reflected in Fig. 3 by the portion of the curve X between the points C and D thereof, wherein it will be seen the voltage decreases almost instantaneously. By the maintenance of a sufficient low level voltage across the transistor, the substantial current passing therethrough at the point D on the curve X of the transistor characteristic will continue to flow. Further increases in applied voltages will produce a proportionate increase in current beyond this point, as illustrated.

From the foregoing it will be seen that the transistor of the present invention may be employed as a switching device in various electrical and electronic circuits. More conventional applications of the transistor hereof than illustrated would normally include, in addition to a relatively steady state bias supply, a pulse voltage source connected in the circuit for the purpose of supplying the switching voltage to the transistor whereby same is driven to the point on the operating curve thereof whereat reverse voltage breakdown of the central transistor junction 14 occurs and forward biasing of the transistor junctions 17 and 19 likewise results from the current flowing through the central transistor zones 12 and 13. Application of such a voltage pulse for a very short period of time is sufficient to switch the transistor hereof from the "off" state to the "on" state and, with the steady state bias voltage applied thereto being of adequate value, continued conduction of the switch will result. Return of the transistor to the "off" state may be readily accomplished by removal of the applied bias voltage maintaining same in the low impedance conducting state thereof either by the actual physical disconnection of the bias voltage supply or by the application of a reverse voltage pulse which cancels out the bias voltage momentarily. By utilizing preferred diffusion techniques in the structure of the present invention, very rapid actions are attainable herewith. Minimization of the size of the transistor zones is of particular importance in this respect. By limiting the end transistor zones to an area of the order of microns, and likewise maintaining the separation between the central transistor junction 14 and the other transistor junctions 17 and 19 in a like dimension range, highly advantageous high frequency responses are possible herewith. Furthermore, the surrounding of the end transistor zones by the adjacent intermediate transistor zone, as illustrated, to form a common surface including at least two zones at each end of the transistor serves to further materially minimize the surface leakage currents. Not only does the above-described structure provide a ready egress path for minority carriers in the intermediate transistor zones 12 and 13, so as to substantially improve the predictable performance of the switch hereof, but furthermore the dependence upon surface leakage currents encountered in the prior art devices of this type is herein substantially removed. Together with the minimization of surface leakage currents, as noted above, the present invention provides for the precise predetermination of the current level at which forward biasing of the end transistor junctions 17 and 19 occurs. Such forward biasing is dependent almost entirely upon the current passing through the bulk resistance of the intermediate transistor zones. Consequently, the resistance of these zones may be reduced to such a point that a very material current flow therethrough is required to establish the necessary voltage drop to forward bias the end transistor junctions. In this manner the internal current is made of sufficient value that the surface leakage current is insignificant by comparison. Substantially only the internal currents of the transistor are then controlling in establishing the switching point thereof. Consequently, the previously encountered difficulties with surface leakage current which are well known to be relatively unpredictable and also variable with transistor lifetime and surface contamination, are wholly obviated. The utilization of a plurality of end transistor zones, as illustrated, is also advantageous although not necessary, for in this manner an additional reduction in the effect of surface leakage currents is attained.

Figure 2:
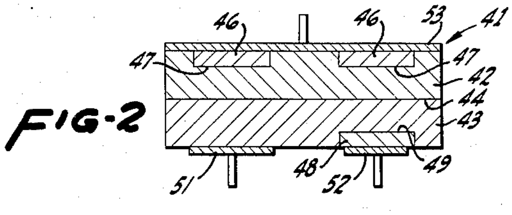
Fig. 2 is a schematic illustration in sectional view of an alternative embodiment of the switch of this invention.

It will be appreciated that certain switching applications require the utilization of separate control means which are preferably fulfilled by a three-element switch. Although the foregoing two-contact P-N-P-N transistor configuration is highly advantageous as a switching device and in great part overcomes serious difficulties encountered in this type of switching arrangement, the invention hereof may be modified to provide a three-element device suitable for particular applications. Reference is made to Fig. 2 in this respect wherein there is illustrated a transistor 41 formed of a monocrystalline semiconducting material such as silicon. The transistor 41 is formed into four zones of different types of conductivity, as by conventional manufacturing techniques such as diffusion techniques. The resultant transistor structure includes a pair of intermediate zones 42 and 43 separated by a transistor junction 44. Similarly to the above-described embodiment of the invention, one or more minute transistor zones 46 are formed in the upper surface of the zone 42 and separated therefrom by transistor junctions 47, with the transistor zones 42 and 46 having a common upper surface. Preferably, the intermediate transistor zone 42 entirely surrounds the transistor zone or zones 46 at this common surface for the same reasons as set forth above in connection with the two-contact transistor of the present invention. A lower end transistor zone 48 is provided, preferably in inset relation to the intermediate zone 43 and surrounded thereby. A transistor junction 49 separates the transistor zones 43 and 48 and this lower transistor zone 48 is preferably disposed in off-center relationship to the intermediate transistor zone 43 in order to expose a substantial undersurface of this zone for the connection of an ohmic contact 51 thereto. This ohmic contact 51 engages only the intermediate zone 43 of the transistor and another ohmic contact 52 is disposed in non-rectifying engagement with the lower or terminal transistor zone 48. Care must be taken in this respect that the ohmic contact 52 does not extend beyond the boundaries of the transistor zone 48 so as to electrically short the transistor junction 49. A further ohmic contact 53 is disposed atop the transistor body in non-rectifying relationship to the intermediate transistor zone 42 and upper end transistor zone 46. This ohmic contact 53 forms electrical contact with both of the transistor zones 42 and 46 so as to thereby electrically short the transistor junction or junctions 47 in a manner similar to that described above in connection with the embodiment of Fig. 1. Electrical connection to the transistor illustrated in Fig. 2 may be similar to that described above in that a reverse bias voltage is applied between the ohmic contacts 52 and 53 so as to reverse bias the central transistor junction 44. As regards this portion of the possible external electrical circuitry, operation is quite similar to that set forth in connection with the diode embodiment of the invention. The additional ohmic contact 51 is adapted for connection to suitable control means so that the intermediate zone 43 then serves as a control electrode for the switch.

Operation of the transistor illustrated in Fig. 2 and described above is quite similar to the described operation of the diode embodiment of this invention in that the application of a relatively low voltage between the ohmic contacts 52 and 53 will cause substantially no current flow through the device inasmuch as the reverse bias of the central transistor junction 44 thereby prevents material current conduction. Raising of the amplitude of this applied voltage causes only a relatively minor increase in current conduction through the switch in the same manner as the diode. This is illustrated in Fig. 3 of the drawings by the curve Y wherein the initial portion of such curve between the points A and B is coincident with the curve X therein illustrated as the characteristic of the diode 11. It will be seen that with conduction occurring between the contacts 52 and 53, initial conduction in the "off" state of the four-element transistor occurs across the transistor junction 49 in a forward direction and across the transistor junction 44 in a reverse direction. By the application of a suitable control voltage to the ohmic contact 51 engaging the transistor zone 43 it is possible then to vary the point at which reverse voltage breakdown of the central transistor junction 44 occurs. In this embodiment of the invention it is preferable to orient the transistor zones from the top to the bottom thereof, as illustrated, as N-P-N-P. Through suitable and conventional control techniques in the manufacture of the transistor and its zones, the alpha of the upper three zones N-P-N, is preferably made quite high and thus following sufficient current conduction through the zone 42 to forward bias the transistor junction 47 thereof there will be introduced into the transistor internal circuit a material increase in the overall current gain thereof. This then serves to maintain the switch in a conducting state at a materially reduced voltage, as illustrated by the further portions of the curve Y in Fig. 3. In this instance it will be noted that the voltage-current characteristic Y is characterized by a spike or peak occurring at the point B inasmuch as no forward biasing of the transistor junction 49 by an internal voltage drop in the transistor is herein required. Aside from the variation in the voltage-current characteristics between the points B and D, i.e., the transition between the "off" state and the "on" state of the transistor, the switching characteristics are identical. Thus curves X and Y of Fig. 3 will be seen to coincide during both of the stable switching states of the device.

There has been described above two preferred embodiments of the present invention which exemplify practical transistor switching devices exhibiting material advances in the art. In accordance herewith it is possible to produce P-N-P-N transistor switches having precisely controllable and predeterminable operating characteristics. In distinction to prior art devices, the switching device of the present invention is not dependent upon poorly controlled or variable parameters of the device design. In particular, surface leakage currents play no important part in the operation of the present invention. By the minimization of surface leakage it is herein possible to reduce the effect thereof and furthermore by the establishment of switching conditions through the precisely controllable resistivity of transistor zones the switching current is herein maintained at such a level that surface leakage currents are relatively insignificant in comparison thereto. Thus, the total voltage drop through the switch is substantially entirely dependent upon conduction through the sheet resistance of the transistor zone. Inasmuch as surface leakage current is dependent upon surface contamination and variations in surface conditions, all of which are quite difficult to control or predict, a material advantage is herein attained by the exclusion of surface effects from predominantly influencing operation of the device. Additionally, the switching device hereof is admirably suited to very high frequency applications for the minute sizes of the transistor zones serve in themselves to enhance high frequency operating characteristics. Furthermore, the direct connection of an ohmic contact to one or more intermediate transistor zones of the switching device provides for the rapid egress of minority carriers from the zones so contacted and such further serves to reduce time delays in the device and thereby materially improve the high frequency operating characteristics thereof.

What is claimed is:

1. An improved P-N-P-N semiconductor switching device comprising a semiconductor body of four zones of alternately different conductivity types successively interposed between two different faces of said body and with at least one end zone being inset into the next adjacent zone to define a surface on one face common to both zones, and at least two ohmic contacts each engaging a different one of said faces with one thereof electrically contacting substantially all of said common surface to engage both zones thereat, said contacts being adapted for connection to a variable power supply whereby a transistor junction between the two zones at said common surface is only forward biased by current flow through the zone next adjacent the end zone.

2. An improved P-N-P-N transistor switching device comprising a monocrystalline body of semiconducting material having selected impurities therein defining four zones of P-N-P-N polarity arrangement, the end zones of said transistor having minute dimensions and being inset into the adjacent central zones to define transistor end surfaces that are each common to two zones, and a pair of ohmic contacts with each one thereof substantially covering separate common end surfaces of said body in electrical connection with the two zones thereat whereby the application of an increasing voltage between said contacts of a reverse polarity to a central transistor junction switches said transistor from a high impedance state to a low impedance state by reverse breakdown of said central junction and internal biasing of the other transistor junctions to conduction through all transistor zones.

3. An improved P-N-P-N transistor switching device comprising a monocrystalline body of semiconducting material having selected impurities therein defining four zones of P-N-P-N polarity arrangement, at least three adjacent transistor zones of said transistor having a high current gain, and at least two ohmic contacts engaging said body with at least one thereof in electrical connection to both a P and an N zone thereof at one end of said transistor body for electrically shorting the transistor junction therebetween whereby the application of an increasing voltage across said transistor of such a polarity as to reverse bias the central transistor junction thereof produces only a low current conduction therethrough to the point of reverse voltage breakdown of said central transistor junction whereat current flowing through said transistor zones produces a forward biasing of the electrically shorted transistor junction to cause conduction through all four transistor zones with a consequent substantial increase in the total current gain thereof.

4. An improved P-N-P-N semiconductor switching device comprising a semiconductor body of four zones of alternately different conductivity types with at least one end zone being inset into the next adjacent zone to define a surface common to both zones such that said end zone is substantially surrounded upon said surface by the next adjacent zone, and at least two ohmic contacts engaging said body with one thereof electrically contacting substantially all of said common surface to engage both zones thereat, said contacts being adapted for connection to a variable power supply whereby a transistor junction between the two zones at said common surface is only forward biased by current flow through the zone next adjacent the end zone.

5. An improved P-N-P-N switching device as described in claim 4 further defined by both ends of said body having a surface common to the end zone thereat and the next adjacent zone thereto, and said ohmic contacts substantially covering each of said common surfaces to thereby each engage an end zone and next adjacent zone whereby only a central transistor junction between central zones is not electrically shorted by electrical contacts.

6. The switching device as described in claim 3 further defined by having a second and a third ohmic contact in addition to said one contact which engages both a P and an N zone in one end of said body, said second contact solely engaging the zone adjacent to said central transistor junction not engaged by said one contact and adapted for connection to a source control voltage for varying the point at which the reverse voltage breakdown of said central transistor junction occurs, said third contact engaging the other zone not otherwise engaging a contact.

References Cited in the file of this patent

UNITED STATES PATENTS

| | | |
|---|---|---|
| 2,623,103 | Kircher | Dec. 23, 1952 |
| 2,770,761 | Pfann | Nov. 13, 1956 |
| 2,861,018 | Fuller et al. | Nov. 18, 1958 |
| 2,875,505 | Pfann | Mar. 3, 1959 |
| 2,911,539 | Tanenbaum | Nov. 3, 1959 |
| 2,913,676 | Pankove | Nov. 17, 1959 |
| 2,918,628 | Stuetzer | Dec. 22, 1959 |